United States Patent [19]

Ricca et al.

[11] 3,869,179
[45] Mar. 4, 1975

[54] BRACKET AND BOLT-RETAINING MEANS FOR TRACTOR ROLLER ASSEMBLIES

[75] Inventors: John S. Ricca, Bartonville; Robert N. Stedman, Chillicothe, both of Ill.

[73] Assignee: Caterpillar Tractor Company, Peoria, Ill.

[22] Filed: Sept. 17, 1973

[21] Appl. No.: 397,585

[52] U.S. Cl. .................. 308/34, 403/154, 308/20
[51] Int. Cl. ............................................. F16c 25/00
[58] Field of Search ......... 308/34, 20; 151/41.7, 69, 151/16; 403/154, 378, 379

[56] References Cited
UNITED STATES PATENTS

| | | | |
|---|---|---|---|
| 738,598 | 9/1903 | Berry | 151/16 |
| 830,169 | 9/1906 | Porter | 403/378 |
| 1,362,163 | 12/1920 | Burden | 308/34 |
| 1,429,117 | 9/1922 | Thomas | 151/69 |
| 1,838,216 | 12/1931 | Dickey | 403/154 |
| 1,900,991 | 3/1933 | Matheson | 403/154 |
| 2,922,456 | 1/1960 | Kann | 151/41.7 |
| 3,390,925 | 7/1968 | Fangman | 308/28 |
| 3,515,446 | 6/1970 | Maguire | 308/20 |

Primary Examiner—Wesley S. Ratliff, Jr.
Attorney, Agent, or Firm—Phillips, Moore, Weissenberger, Lempio & Strabala

[57] ABSTRACT

Mounting brackets are retained within crawler tractor roller assemblies by bracket-retaining means including an obliquely fitted lock pin angled between the bracket and roller shaft; such bracket-retaining means are particularly useful in restraining individual mounting brackets from axial and rotary displacement during storage and handling of the asembly. Assembly bolts are retained within these mounting brackets by bolt-retaining means including an elastomeric retainer snugly fitted to the bolt and compressible into a subjacent shallow relief in the bracket during installation of the roller assembly in the tractor.

8 Claims, 4 Drawing Figures

BRACKET AND BOLT-RETAINING MEANS FOR TRACTOR ROLLER ASSEMBLIES

BACKGROUND OF THE INVENTION

This invention relates to a track roller assembly. In particular, this invention relates to retaining means for roller assembly components which facilitate assembly, storage, shipping and mounting of the roller assembly unit.

Typically, crawler tractors extensively used, for example, in the earthmoving and construction industries are equipped with a plurality of track rollers used in conjunction with complementing operating gear, including driving and steering gear such as idlers, drive sprockets and track chains.

These track rollers are conventionally stored or supplied for spare parts usage as an assembly of their component parts, including hubs, support shafts, bearings, mounting brackets and end collars. It is therefore important that these components be efficiently retained within the assembly to prevent inadvertent separation and possible loss of lubricating oil and these components; it is also in many instances advantageous to retain these components in proper orientation to related components to facilitate installation of the assembly in the tractor. Further, it is highly desirable in the interests of economy and convenience that these retaining means facilitate the assembly of the roller components as well as facilitate the installation and retention of the roller assembly in the tractor vehicle.

Retaining means for roller assembly components known in the prior art have frequently been unsatisfactory in accomplishing these and other objectives. For example, the assembly bolts conventionally associated with the mounting brackets of the roller assembly are typically retained in position by bolt-retaining sheet metal tags or nuts, which must be tediously secured and then removed prior to installation of the roller assembly in the tractor; further, these tags or nuts are usually discarded after removal, and since they are of relatively expensive material this represents a substantial economic loss over a period of time. For another example, mounting brackets are frequently retained in position within the roller assembly by such devices as snap rings and interlocking shear keys which typically require costly preparatory machining and/or relatively complicated assembly procedures.

SUMMARY AND OBJECTS OF THE INVENTION

It is therefore an object of this invention to provide means for retaining assembly bolts within roller assembly mounting brackets which facilitate assembly of these components and which facilitate installation and retention of the roller assembly in the tractor vehicle.

It is an additional object of this invention to provide means for retaining assembly bolts within mounting brackets which effectively retain these bolts within the brackets and yet are inexpensive.

It is another object of this invention to provide simple means for retaining mounting brackets within roller assemblies whereby inadvertent separation and loss of these brackets from the roller assembly is substantially prevented.

It is a further object of this invention to provide simple means for retaining mounting brackets within roller assemblies whereby axial and rotary movement of the brackets is substantially prevented.

It is yet another object of this invention to provide means for retaining mounting brackets within roller assemblies which allow convenient roller manufacture, assembly, storage, and shipping, and also allow ready detachment of the retained brackets, thereby facilitating servicing of the assembly.

Accordingly, the invention comprises assembly bolt retaining means and mounting bracket retaining means whereby the bolts and brackets may be retained within roller assemblies in the desired position in a simple, efficient manner at minimal cost, and whereby manufacture, assembly, storage, shipment and installation of the roller assemblies is facilitated.

The bolt retaining means of this invention include elastomeric retainers which secure the assembly bolts to the mounting brackets; these retainers are compressed into subjacent depressions provided in the mounting brackets as the bolts are secured to the roller frame during installation of the roller assembly.

The mounting bracket retaining means of this invention include an obliquely fitted lock pin providing an eccentric locking condition between the bracket and roller shaft, which secures the mounting bracket to the shaft; the mounting bracket retaining means of this invention are particularly adapted to preventing rotary and axial displacement or separation of individual mounting brackets used in conjunction with roller designs such as those more fully described hereinafter.

DETAILED DESCRIPTION

Figure 1:
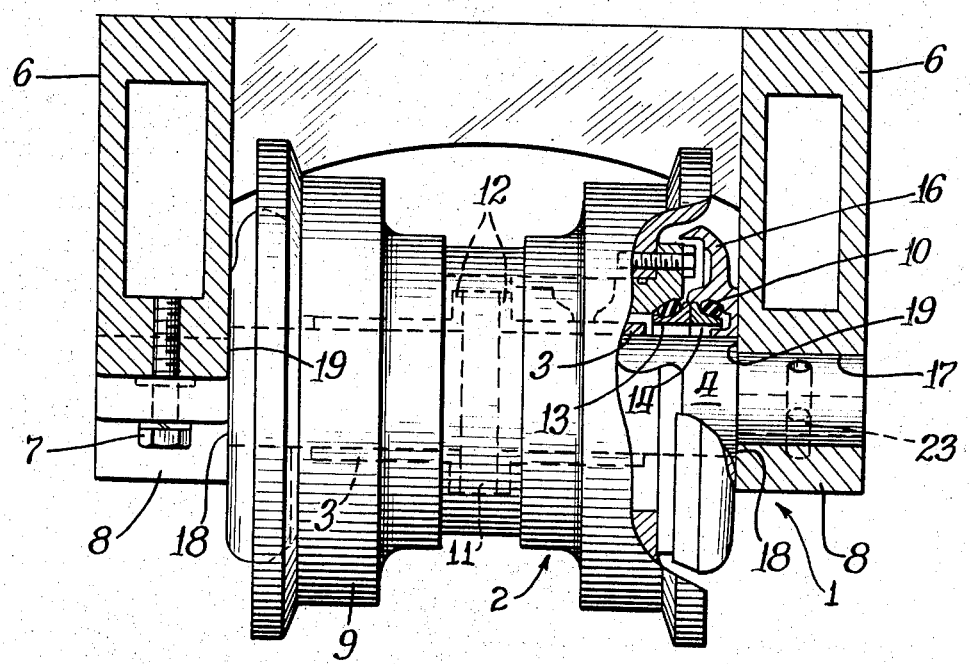
FIG. 1 is a front elevation view in partial cross section of a track roller mounted on a rail incorporating the subject invention.
Figure 2:
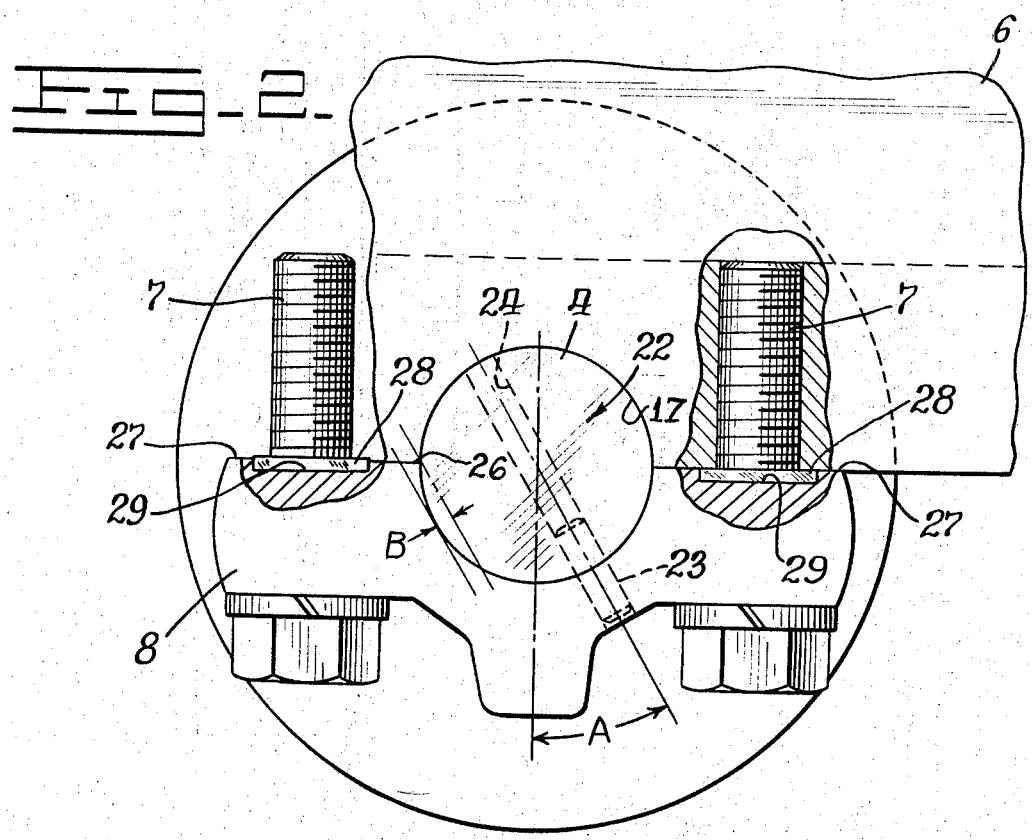
FIG. 2 is an end view of the same with the rail partially removed and cut away for purposes of clarity.

FIGS. 1 through 4 illustrate track roller assemblies including the retaining means of this invention. With particular reference to FIG. 1, roller assembly 1 comprises a hub 2 rotatably supported by bearings 3 on shaft 4 that extends between and is attached to roller frame rails 6 by pairs of bolts 7 and mounting brackets 8. Hub 2 includes two axially spaced rim sections 9 joined as by welding and axially retained on shaft 4 by an intermediately disposed center flange 11 rotatably engaging radial engaging thrust flanges 12 on bearings 3. Means for holding and distributing lubricant to bearings 3 such as seals, one of which is shown at 10, disposed concentrically about shaft 4 and operatively contained between tapered bore 13 and similar bore 14 in the end of roller 2 and the inner face of end collar 16, respectively, are provided; these seal means are more fully described in U.S. Pat. Nos. 3,073,689 and 3,180,648, of common assignment herewith. The improved roller design illustrated in FIG. 1 includes semicircular notches 17 in the base of rails 6 which allow stronger, full-diameter shaft mountings in notches 17 which effectively accommodate high longitudinal roller loads. Circumferential shoulders 18 are formed by reducing the diameter of the ends of the shaft mountings, and high axial thrust loads are accommodated by the resulting transfer of axial thrust applied to center flange 11 to extensions 19 of rails 6. This "notch and shoulder" method of controlling roller loads has obviated the necessity for the use of sturdy coupling means such as interlocking keys and/or heavy snap rings, and permitted the separation of heretofore integral mounting brackets and protective end collars, thus permitting the use of less expensive materials in the manufacture of the end collars. FIG. 2 illustrates such a separated or individual mounting bracket 8, incorporating the mounting bracket retaining means 22 of this invention. Bracket retaining means 22 includes obliquely directed lock pin 23 press fitted into and securing bracket 8 to the end of shaft 4. The oblique angle of entry "A" of lock pin 23 through receiving bore 24 in shaft 4 substantially creates an over-center or eccentric locking condition (shown at "B") between inner edge 26 or bracket face 27, and shaft 4. That is, any tendency of bracket 8 to move away from shaft 4 would be directed by the pin in the oblique angle direction A. However, inner edge 26 would interfere with such movement by a distance B which is in the path thereof. A suitable angle for angle A has been found to be about 30°. Angles on either side of 30° are also thought to be suitable in creating the eccentric locking condition. The locking relationship of bracket 8 and pin 23 also prevents both axial and rotary movement of bracket 8. Although the bracket retaining means of this invention is particularly useful in retaining individual brackets in position in a roller assembly, it is alternatively useful in retaining conventional composite brackets and end collars, while providing a conveniently manufactured and handled roller assembly.

FIG. 2 further illustrates the bolt-retaining means of this invention including elastomeric retainers 28 securing bolts 7 to bracket 8. Retainers 28 are of a diameter sufficiently smaller than bolts 7 to provide a fit that will retain bolts 7 in position in brackets 8, and yet permit retainers 28 to be readily affixed to bolts 7. Shallow reliefs 29 in faces 27 of bracket 8 are provided to allow compression and/or extrusion of the elastomer (conveniently rubber) as the roller assembly is rigidly secured to the roller frame rails 6 by tightening bolts 7. The reliefs 29 are of sufficient depth to alternatively allow the use of noncompressible metallic bolt retainers such as sheet metal seating locks or Speed-Nuts, if they should be more readily available, without detrimentally interfering with the abutting union of bracket 8 and rails 6.

Figure 3:
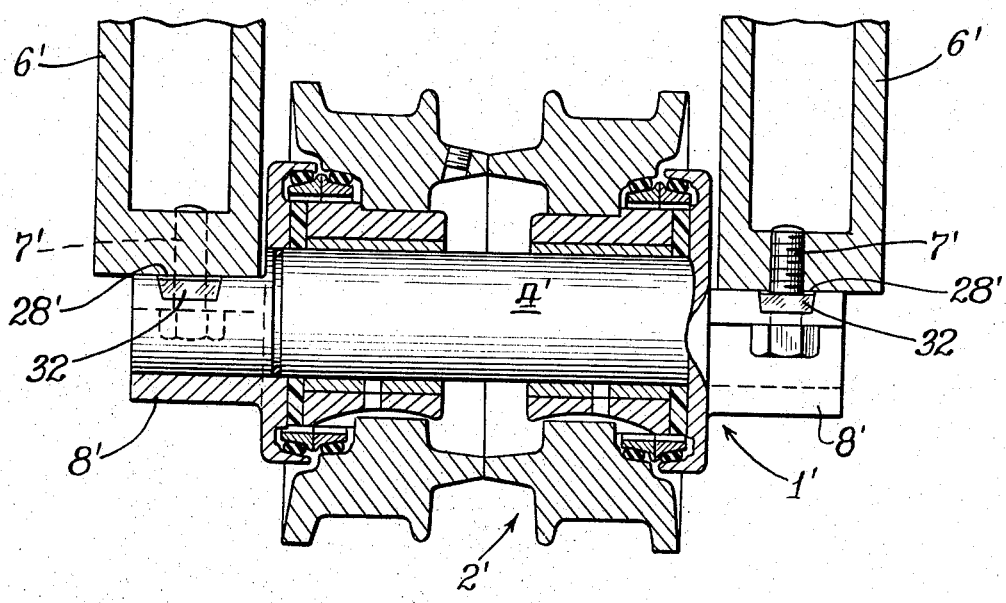
FIG. 3 is a front elevation view in partial cross section of another embodiment.
Figure 4:
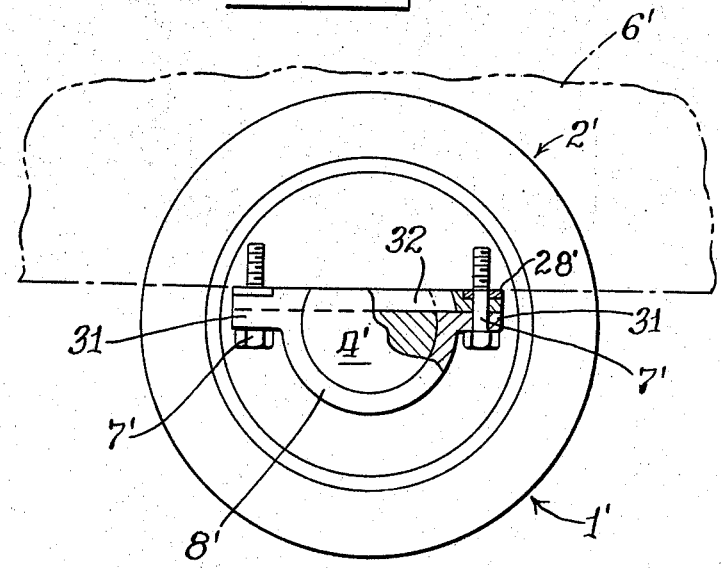
FIG. 4 is an end view of the same illustrating details thereof.

With particular reference to FIGS. 3 and 4, an alternate roller assembly more fully described in U.S. Ser. No. 163,628 filed July 9, 1971, by Casey, now U.S. Pat. No. 3,744,860, issued July 10, 1973, and of common assignment herewith is illustrated incorporating an alternate embodiment of the bolt-retaining means of this invention. Identical mounting brackets 8' are retained in track roller assembly 1' and restrained against axial and rotary displacement by interlocking shear keys 32. Bolt holes 30 are provided in keys 32 for the accommodation of bolts 7' which are retained in position in brackets 8' by retainers 28' prior to installation of the roller assembly. Keys 32 are provided with shallow reliefs surrounding the bolt holes into which retainers 28' are compressed when the roller assembly is secured to the roller frame rails 6' by tightening bolts 7'; alternatively, sheet metal retainers may be employed as previously described. Preferably, heads of bolts 7' and bracket flanges 31 are sufficiently large to ensure the secure attachment of the roller assembly to the roller frame.

If desired, the bracket-retaining means of this invention as illustrated in FIGS. 1 and 2 may be alternatively employed to retain brackets 8' to the roller assembly of FIGS. 3 and 4 instead of the shear keys 32 illustrated.

The bolt-retaining and bracket-retaining means of this invention are readily adaptable to many roller assemblies, either together or in conjunction with alternate bolt-retaining means or bracket-retaining means such as shown in FIGS. 3 and 4. Specific examples of other roller assemblies to which these retaining means may be adapted include that assembly described in U.S. Pat. No. 3,515,446, of common assignment herewith.

It is to be understood that the foregoing description is merely illustrative of preferred embodiment of the invention and that the scope of the invention is not to be limited thereto, but is to be determined by the scope of the appended claims.

What is claimed is:

1. In a roller assembly comprising a roller hub rotatably supported on a shaft,
   a. mounting means for mounting said assembly on a roller frame, said mounting means including,
   b. a mounting bracket including a pair of bolts on opposite sides of a central, journal portion receiving said shaft, said bolts being in spaced, substantially parallel relation and defining a bolt axis, said mounting bracket being retained within said assembly bracket-retaining means including,
   c. a lock pin, said lock pin being fitted within a bore extending from said mounting bracket and into said shaft and which is at an oblique angle to said bolt axis so that any tendency of said mounting bracket to move away from said shaft would be directed in the oblique angle direction by said pin.

2. The roller assembly of claim 1, wherein said mounting bracket is an individual mounting bracket.

3. The roller assembly of claim 1 wherein said oblique angle is approximately 30°.

4. In a roller assembly comprising a roller hub rotatably supported on a shaft,
   a. mounting means for mounting said assembly on a roller frame, said mounting means including,
   b. a mounting bracket including a pair of bolts on opposite sides of a central, journal portion receiving said shaft, said bolts being in spaced, substantially parallel relation and defining a bolt axis, said mounting assembly bracket retaining means including,
   c. a lock pin, said lock pin being fitted within a bore extending from said mounting bracket and into said shaft and which is at an oblique angle to said bolt axis so that any tendency of said mounting bracket to move away from said shaft would be directed in the oblique angle direction by said pin, said mounting assembly bracket-retaining means further comprising,
   d. bolt-retaining means for retaining said bolts within said bracket, said bolt-retaining means comprising a shallow relief disposed about a bolt hole receiving each of said bolts.

5. The roller assembly of claim 4 wherein said oblique angle is approximately 30°.

6. The roller assembly of claim 4, wherein said bolt-retaining means is compressible.

7. The roller assembly of claim 4, wherein said bolt-retainer is non-compressible, and said shallow relief is of a size sufficient to accommodate said bolt-retainer.

8. The roller assembly of claim 4, wherein said bolt-retaining means further comprise key means forming said shallow relief, said key means restraining axial and rotary displacement of said bracket.

* * * * *